United States Patent
Okbay et al.

(10) Patent No.: US 6,606,677 B1
(45) Date of Patent: Aug. 12, 2003

(54) HIGH SPEED INTERRUPT CONTROLLER

(75) Inventors: Bitwoded Okbay, Gilroy, CA (US); Andrew Dale Walls, San Jose, CA (US); Michael Joseph Azevedo, San Jose, CA (US)

(73) Assignee: international Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,876

(22) Filed: Mar. 7, 2000

(51) Int. Cl.$^7$ .......................... G06F 13/24; G06F 13/32
(52) U.S. Cl. ...................... 710/262; 710/260; 710/266; 710/269
(58) Field of Search ................................. 710/260–269

(56) References Cited

U.S. PATENT DOCUMENTS

| | | | |
|---|---|---|---|
| 4,669,057 A | | 5/1987 | Clark, Jr. et al. |
| 4,862,354 A | * | 8/1989 | Fiacconi et al. ............ 709/206 |
| 5,133,056 A | | 7/1992 | Miyamori |
| 5,179,704 A | | 1/1993 | Jibbe et al. |
| 5,448,743 A | | 9/1995 | Gulick et al. |
| 5,471,620 A | | 11/1995 | Shimizu et al. |
| 5,481,728 A | | 1/1996 | Matsutani |
| 5,555,420 A | | 9/1996 | Sarangdhar et al. |
| 5,560,018 A | * | 9/1996 | Macon et al. ................. 710/260 |
| 5,590,312 A | * | 12/1996 | Marisetty ...................... 703/23 |
| 5,603,035 A | | 2/1997 | Erramoun et al. |

(List continued on next page.)

FOREIGN PATENT DOCUMENTS

| | | |
|---|---|---|
| EP | 0 886 217 A2 | 12/1998 |
| JP | 08263302 | 10/1996 |
| JP | 09251388 | 9/1997 |
| JP | 09282165 | 10/1997 |
| JP | 10116201 | 5/1998 |

OTHER PUBLICATIONS

"Reducing Interrupt Latency in Multi–Tasking Operating Systems Running on PC and PC Compatibles/Clones," IBM Technical Disclosure Bulletin, vol. 34, No. 4A, Sep. 1991, pp. 454–455.

Integrated Hardware/Software Interrupt Controller, IBM Technical Disclosure Bulletin, vol. 31, No. 10, Mar. 1989, pp. 437–444.

"Microprocessor Interrupt System Extension," IBM Technical Disclosure Bulletin, vol. 22, No. 2, Jul. 1979, pp. 757–759.

"Input/Output Controller," IBM Technical Disclosure Bulletin, vol. 20, No. 12, May 1978, pp. 5294–5297.

*Primary Examiner*—Glenn A. Auve
*Assistant Examiner*—Trisha Vu
(74) *Attorney, Agent, or Firm*—Altera Law Group, LLC

(57) ABSTRACT

A high speed interrupt controller and interrupt discrimination scheme for a data communication system is provided, usable in a subsystem of a data communication system. The controller and its scheme may be used for expanding the number of interrupts to be efficiently received and discriminated by a processor having a limited number of interrupt input lines. The present invention can be used for optimizing the management of data within a shared bus with multiple masters, wherein a shared bus is connected to a plurality of bus masters and corresponding slaves and located between an external bus connected to a system processor, and an internal bus connected to an internal processor. The architecture utilizes the high speed interrupt controller device having a circuitry which has a plurality of interrupt lines and may have one output line and a control code, located in the device interrupt handler. The circuitry consists of a status register where an appropriate bit is set when an interrupt is received from an external interrupt source device, and an interrupt mask register which enables and disables certain interrupts. The control code is used for monitoring and controlling the circuitry and servicing the interrupts received by the processor.

30 Claims, 4 Drawing Sheets

U.S. PATENT DOCUMENTS

| | | |
|---|---|---|
| 5,613,128 A | 3/1997 | Nizar et al. |
| 5,628,018 A | 5/1997 | Matsuzaki et al. |
| 5,727,227 A | 3/1998 | Schmidt et al. |
| 5,745,771 A | 4/1998 | Ohyama et al. |
| 5,875,342 A * | 2/1999 | Temple ................ 710/260 |
| 5,913,045 A | 6/1999 | Gillespie et al. |
| 5,918,057 A | 6/1999 | Chou et al. |
| 5,925,115 A | 7/1999 | Ponte |
| 6,247,091 B1 * | 6/2001 | Lovett ................ 370/402 |
| 6,272,580 B1 * | 8/2001 | Stevens et al. ........ 710/116 |
| 6,374,286 B1 * | 4/2002 | Gee et al. ................ 709/1 |

\* cited by examiner

HIGH SPEED INTERRUPT CONTROLLER

BACKGROUND OF THE INVENTION

1. Field of the Invention

The present invention generally relates to interrupt servicing mechanisms within computer systems and, more particularly, to a high speed interrupt controller and method for interrupt handling in a data communication system.

2. Description of Related Art

Digital communication over a communication channel is well known in the art. Modem data communication systems often have multiple high performance data processors and generally include a plurality of external devices interconnected by one or more various buses. For example, modern computer systems typically include a system processor coupled through a high bandwidth local expansion bus, such as the peripheral component interconnect (PCI) bus or the VESA (Video Electronics Standard Association) VL bus, to an external shared memory, peripheral devices, and other processors. Examples of devices which can be coupled to local expansion buses include SCSI adapters, network interface cards, video adapters, etc.

High performance bus architectures, such as the PCI bus architecture, provide a hardware mechanism for transferring large sequential groups of data between a peripheral controller's local memory and a system processor's shared memory via burst cycles. In many bus architectures, the maximum burst length is typically not defined.

Systems in which many devices share a common resource, typically utilize arrangements for allocating access to the resource under conditions during which a plurality of associated devices may concurrently request access. High performance systems have the potential to generate multiple independent requests for access to one or more external components, often via a single shared bus interface unit (BIU). Since multiple independent input/output (I/O) requests may appear at the BIU at any given time, the data communication system requires a shared bus arbitration scheme to determine the priority of the I/O requests for accessing the shared bus. In multi-master systems, where one or more data processors have the capability of becoming a bus master, the bus arbitration protocol determines which data processor becomes the bus master first. Typically, these multi-master systems employ an arbiter, external to the data processors, to control the shared bus arbitration, and each data processor requests access to an external shared memory or another external device from the arbiter.

In typical microprocessor systems the bus transports data among the processor and other components. The central processing unit (CPU) is usually the master of the bus, controlling the flow of data to and from the CPU and to the other components of the system, such as printers, memory, displays, and parallel and serial ports. Rather than have the CPU perform complex mathematical calculations, which is very slow, the data may be sent to the dedicated math co-processor where the calculations are performed, freeing the CPU to perform another task. Other masters in a multi-master arrangement may be used for ethernet control as part of a local area network (LAN), video controllers, or some other customized operation.

In a multi-master communication system a system may become hung-up for various reasons and it is necessary to recognize each reason from the type of interrupt received from a particular device. For example, a hang condition could happen due to an unrecognized address on a shared bus, when the system cannot abort the transfer or does not have the ability to ban the bus master from the shared bus. Sometimes a bus master does not give up the shared bus for a long time, thus causing other masters to be unable to proceed with a transfer in time. Other times a condition happening elsewhere in the system makes buffer space or data unavailable for an unacceptable amount of time, so that the bus becomes unusable.

If a bus hang condition occurs on a shared bus within a subsystem of a communication system with several subsystems, so that a transfer operation cannot be completed, it is possible that the entire subsystem will not be able to proceed any further. The subsystem processor may itself be unable to proceed (e.g. is presently attempting to read an address via the hung shared bus) and therefore cannot be used to recover from the hang condition. If the subsystem hang condition must be reset from an external source (i.e., from the system's main computer via a bus external to the subsystem), the loss of information on either transferring data and/or error conditions may occur. It may also result in the subsystem being unable to interact with other subsystems while the recovery is taking place and/or during the time it takes for the external source to realize that a problem has occurred in the subsystem. This may in turn require further recovery efforts to become necessary. In other conventional systems, the entire subsystem has to be reset, via an external source. This not only causes the loss of error/recovery information but may cause additional problems with any other subsystem of the communication system, with which the subsystem getting reset is interfacing.

In most systems, an input/output (I/O) operation can proceed in parallel with processor program execution. Interrupts and interrupt handlers allow the processor to execute a program concurrently with the I/O operation, and be signaled as soon as the I/O operation is completed or unsuccessfully interrupted. An interrupt is a signal sent to the processor alerting it to a significant event, and awaiting to the processor's response. The interrupt stops the currently executing program and transfers control to an interrupt service routine (ISR) or device interrupt handler, which performs some appropriate action. When finished, the ISR returns control of the processor to the interrupted program. The processor subsequently restarts the interrupted program in the same state it was in when the interrupt occurred.

In many systems a processor has a limited number of external interrupt input lines, and may even have only one such line. When it receives interrupts from a plurality of peripheral devices and bus adapters, it takes time to find out the source and reason for the interrupt. In such cases there is a desire for increased processor interrupt handling capability, so that the processor can receive and instantly discriminate interrupts from multiple alert and interrupt sources, within a few processor internal bus cycles.

Therefore, there is a need for a method and a system for expanding the number of interrupts which can be efficiently received and discriminated by a processor having a limited number of interrupt input lines. The method and system should be flexible and compatible with a number of digital processor types, modular and easily expandable, and provide improved operational speed. The system and method should be usable in high performance multi-master data communication systems with multiple shared external devices.

SUMMARY OF THE INVENTION

The foregoing and other objects, features, and advantages of the present invention will be apparent from the following detailed description of the preferred embodiments which makes reference to several drawing figures.

One preferred embodiment of the present invention is a high speed interrupt controller system usable in a multi-master data communication system. The interrupt controller system is capable of extending capabilities of a processor with limited number of interrupt input lines to accommodate and discriminate interrupts and alerts from a plurality of interrupting sources. The system has an interrupt controller connected to the processor via a processor bus and configured to receive a plurality of interrupts and alerts from the plurality of interrupting sources, and to assert an interrupt signal to the processor upon receipt of the interrupt from any of the plurality of interrupting sources. The interrupt controller has a masking register for enabling and disabling the interrupts from the plurality of interrupting sources individually, and a device interrupt handler having program instructions for recognizing and servicing individual unmasked interrupts according to the interrupting source, upon receipt of the asserted interrupt signal by the processor.

The interrupt masking register is used for enabling and disabling interrupts by storing a plurality of predetermined interrupt enable flags showing the interrupts permitted to be received by the processor. The interrupt controller further has an interrupt status register, wherein the interrupt status register bits are connected to the corresponding controller interrupt input lines for recognizing individual interrupts according to the controller interrupt status register bits.

The interrupt controller further has a summing device for asserting an interrupt signal to the processor upon receipt of an interrupt from any of the plurality of interrupting sources, wherein the summing device having an OR gate receiving outputs from a plurality of AND gates, each said AND gate corresponding to one interrupting source, and wherein each said AND gate having a first input for receiving an interrupt status register bit and a second input for receiving the inverter corresponding bit from the interrupt masking register.

Another embodiment of the present invention is the method for extending capabilities of a processor with limited number of interrupt input lines, to accommodate and discriminate interrupts and alerts from a plurality of interrupting sources. The method embodiment corresponds to the device embodiment described above.

Yet another embodiment of the present invention is a shared bus multi-master data communication system which extends capabilities of a processor with limited number of interrupt input lines, to accommodate and discriminate interrupts and alerts from a plurality of interrupting sources. The system includes a shared bus located between an external bus connected to a system processor, and an internal bus connected to an internal processor, and a plurality of bus masters and corresponding slaves connected to the shared bus. Some of the masters are associated with the external bus and other masters are associated with the internal bus. The system has the same interrupt controller as described above.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a shared bus high speed interrupt controller and interrupt discrimination scheme usable in a multi-master shared bus subsystem of a communication system, which can be used for expanding the number of interrupts to be efficiently received and discriminated by a processor having a limited number of interrupt input lines. The present invention can be used for optimizing the management of data within a shared bus with multiple masters, which may have a buffering capability.

In the following description numerous details, such as specific memory sizes, bandwidths, data paths, etc., are avoided because it is apparent to one skilled in the art that these specific details are not essential to the practice of the present invention. In particular, the present invention can readily be used in conjunction with a wide variety of data communication system components and bus types, each bus having its own unique protocol, bandwidth, and data transfer characteristics. It is further noted that well known electrical structures and circuits are shown in block diagram form, in a number of figures, in order not to obscure the present invention unnecessarily. Moreover, although the theoretical maximum number of masters is unlimited, the practical maximum is the number that may be accommodated by the system without causing data traffic conflicts or an appreciable slowing down of the system.

In the high performance multi-master data communication systems, various shared bus masters request long continuous burst transfers, as well as short message transfers and register access transactions, and it is important that the transactions are not being excessively delayed. The processors dispatching messages via shared bus masters requiring short burst transfer and register-to-register transfer should have the priority to quickly perform, thus freeing the processors to proceed with other tasks within the system, such as task management. The configuration should minimize the amount of time that data from a particular source must wait to be read to and written, and the latency should be minimized. It is also important for the shared bus resource to be cleared from a hang condition dynamically, and within the subsystem itself, without external help. All these, and other, tasks communicate with a control processor via interrupts. Therefore, a high speed interrupt controller of the present invention is used to efficiently manage interrupts and alerts from multiple sources and from different tasks.

Figure 1:
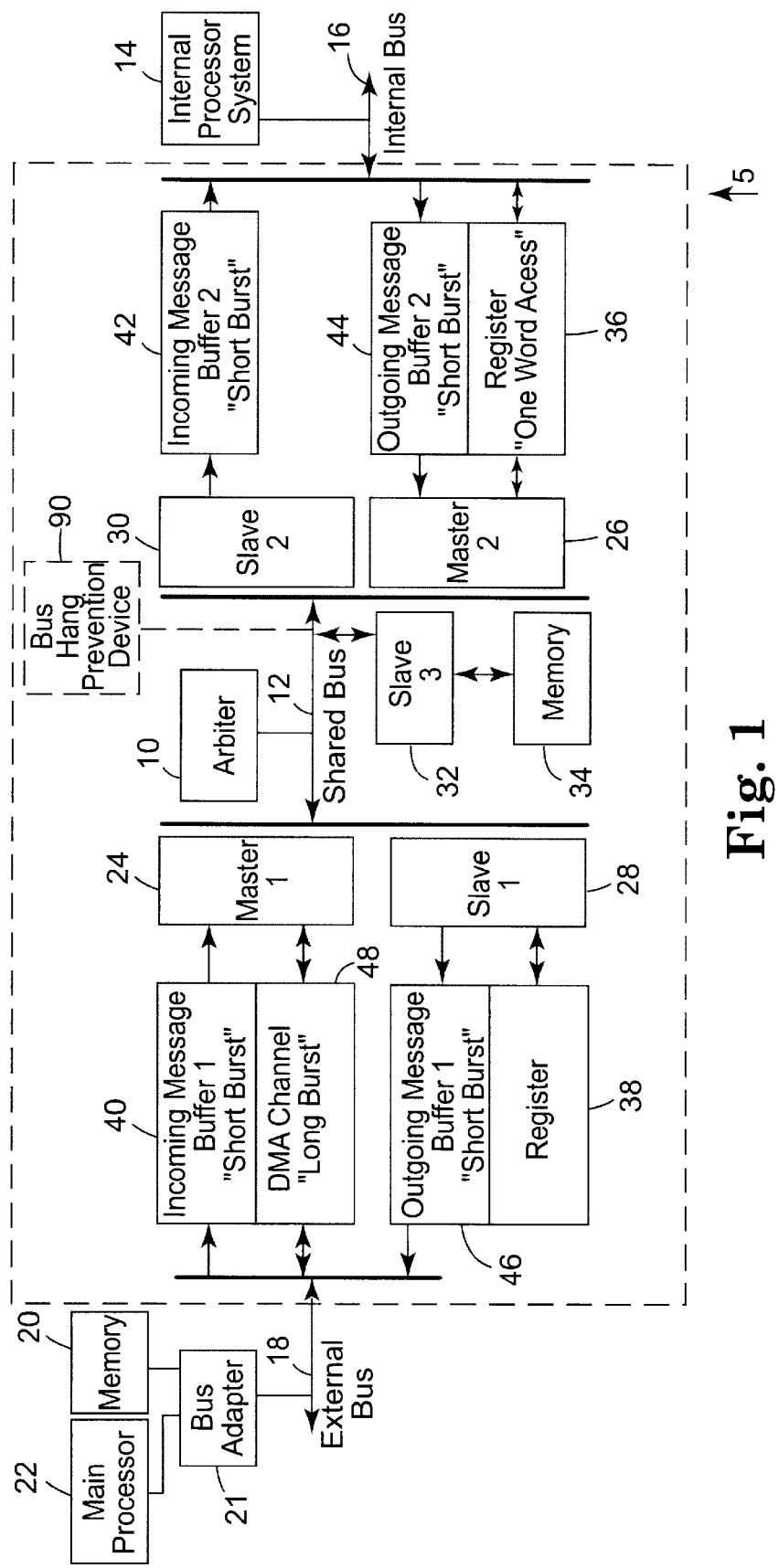
FIG. 1 illustrates a block diagram of an exemplary data communication system incorporating an internal processor system having a high speed interrupt controller of the present invention.
Figure 3:
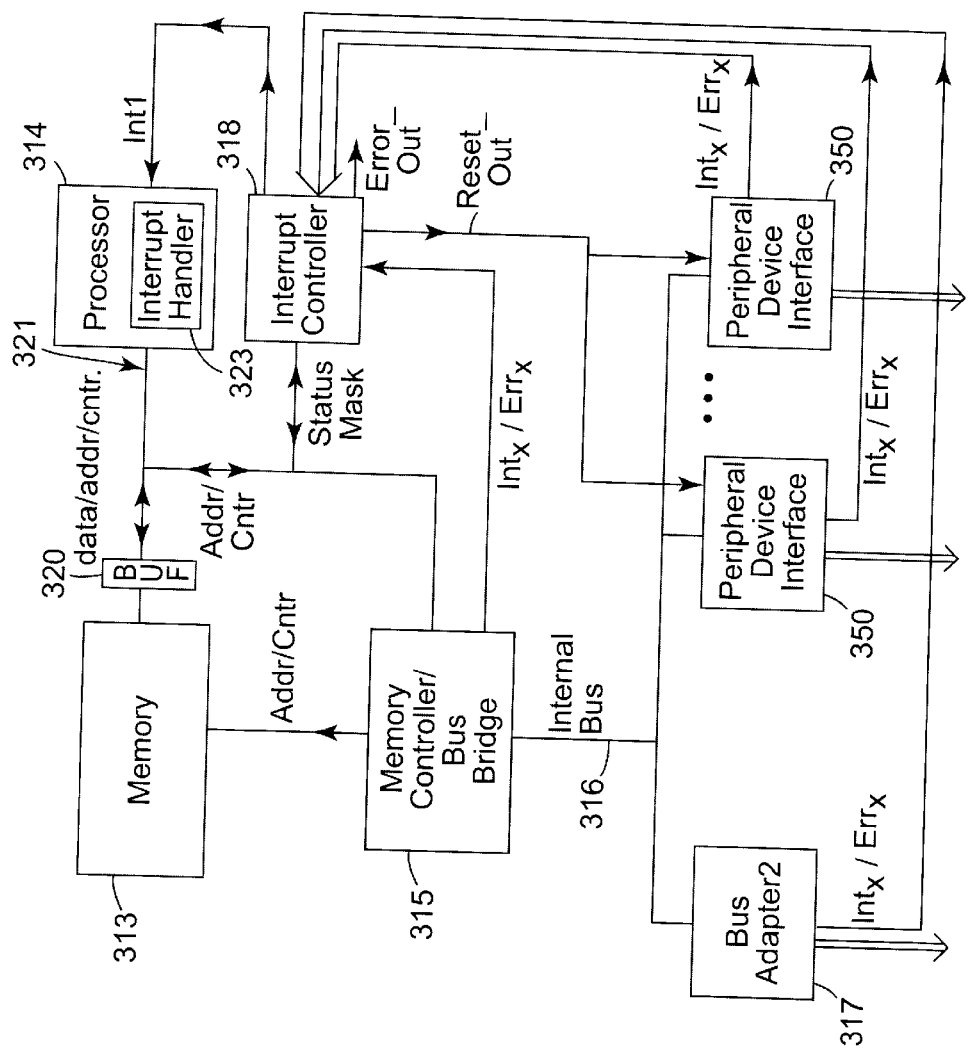
FIG. 3 illustrates a block diagram of the internal processor system of FIG. 1, utilizing the high speed interrupt controller of the present invention.

FIG. 1 illustrates, in a form of a block diagram, an exemplary embodiment of the present invention of a data communication system. The system incorporates a host adapter circuit 5, used between a host processor 22, which is the main system processor with an external central shared memory 20, and an internal processor system 14, connected to at least one external peripheral device interface 350 of FIG. 3. FIG. 3 illustrates a block diagram of the internal processor system 14 of FIG. 1, utilizing a high speed interrupt controller 318 of the present invention. The internal processor system 14 consists of an internal processor 314, an associated instruction and data memory 313, and the high speed interrupt controller 318, all connected to an internal bus 16, via a memory controller/bus bridge 315. It also consists of at least one external peripheral device interface 350, also connected to the internal bus 16, via a bus adapter2 317. The internal processor system 14 is controlled by the processor 314. The internal processor 314 is connected to the data memory 313 via a processor bus 321. This architecture may be used as an adapter or a bridge between the host processor 22 and the peripheral device interface 350, and includes logic, according to the present invention, which allows data transfers between the peripheral devices, not shown, attached to the peripheral device interface(s) 350, and the central shared memory 20. The high speed interrupt controller 318 is used for assisting the processor 314, which has a limited number of interrupt input lines, to quickly discriminate between interrupts from different sources.

As shown in FIG. 1, the internal processor system 14 is connected to the host adapter circuitry 5 via the memory controller/bus bridge 315 and the peripheral internal bus 16, and is used to support the high level management of the interface 350 I/O operations. The host processor 22 and its associated central shared memory 20 are connected to the host adapter circuit 5 via a bus adapter 21 and a high performance external bus 18. In the preferred embodiment of the present invention, the host adapter circuit 5 acts as a bridge between the internal bus 16 and the external bus 18, and utilizes a single shared bus 12, controlled by multiple bus masters, defined below. In this system a bus arbiter 10 is utilized to decide the shared bus 12 ownership.

The primary task of the bridge, such as the host adapter 5 of the present invention, is to allow data to cross from one bus to the other bus without diminishing the performance of either bus. To perform this function, the bridge must understand and participate in the bus protocol of each of the buses. In particular, the bridge must be able to serve in both a slave capacity and a master capacity so that it can accept a request from a first bus as a slave, then initiate an appropriate bus operation on the other bus as a master. The bridge must, therefore, provide support for accesses crossing from one bus to the other.

In the present invention the external bus 18 and internal bus 16 are preferably of a peripheral component interconnect (PCI) bus type. The system central shared memory 20 is preferably a cache memory. It may be a Synchronous Dynamic Random Access Memory (SDRAM), which is a high performance memory structure with clocked or pipelined interface. The peripheral device interface 350 is preferably used with ESCON interface. It also may be the small computer systems interface (SCSI) interface or Fibre Channel interface. However, it is noted that the present invention may be incorporated into any of various types of systems including various types of buses, and other system and peripheral components, as desired. For example, instead of the PCI local bus, it is noted that other local buses may be used, such as the VME bus.

The PCI bus was designed to have a high throughput and to take advantage of the increasing number of local processors that support host I/O functions. For example, most disk controllers, particularly SCSI controllers, and network interface cards (NICs) include a local processor to relieve demands on the host processor. Typically these devices have the capability of operating as bus masters, to allow them to transfer data at the highest possible rates.

In the high performance data communication system of FIG. 1 the host adapter circuit 5 acts as a PCI bus interface supporting the processor 314, acting as an ESCON or SCSI controller, and operating as the PCI bus 18 master, to perform transfers on the PCI bus 18. The publication PCI System Architecture by Tom Shanley and Don Anderson, available from Mindshare press, 2202 Buttercup Dr., Richardson, Tex. 75082 (214) 231-2216, is hereby incorporated by reference in its entirety. For more details on the PCI bus, reference to the PCI Standard Version 2.1, from the PCI Special Interest Group in care of Intel Corp., which is hereby incorporated by reference, is advised.

The host adapter 5 of FIG. 1 includes logic that may interface to various peripherals, which may include DMA channels, memory, interrupt system, timers, a real time clock (RTC), configuration ports, diagnostic ports, and command/status registers (all not shown).

The exemplary embodiment of FIG. 1 is just one of the circuits where the high speed interrupt controller 318 of the present invention may be incorporated. This embodiment includes several master and slave hardware circuits, such as Master1 24, Master2 26, Slave1 28, Slave2 30 and Slave3 32, all preferably implemented in a single ASIC, without any internal processor circuitry. Master1 24 is connected to and communicates with the Slave2 30, and Master2 26 is connected to the Slave1 28. Slave3 32 is connected to a local memory 34, used for the interface 350. In this architecture, only the Master1 24 supports long burst direct memory access (DMA) transfers between the local memory 34 and the central memory 20, via the external bus 18. Therefore, in this architecture all slaves 28, 30, 32 and the Master2 26 are non-streaming devices. The DMA transfers are initiated by the host adapter circuit 5, which also provides a DMA channel, not shown, and buffering for these long burst transfers. Long burst transfers include voluminous data. A request command for the DMA transfer is saved within a DMA request queue within a DMA channel long burst buffer 48, connected to the Master1 24.

In this architecture, short burst transfers occur between the external bus 18 and the internal bus 16 and preferably move between one and eight words between the processor 314 and the host processor 22. If the external bus 18 and internal bus 16 are PCI buses, short burst read and write transfers are accomplished according to the PCI protocol, and transfers can be initiated by the either bus.

Short burst transfer requests contain both the request command and message data, such as I/O addresses. When received from the external bus 18, data is queued into an incoming short burst message buffer1 40 of Master1 24. After the shared bus 12 control is acquired, data is transferred via the shared bus 12 into an incoming short burst message buffer2 42 of the Slave2 30. Short burst transfer data received from the internal bus 16 is received into an outgoing short burst message buffer2 44 of Master2 26, and afterwards transferred via the shared bus 12 into an outgoing short burst message buffer1 46 of the Slave1 28.

In the exemplary embodiment shown in FIG. 1, Master1 24 preferably supports only short burst transfers and long burst transfers. Master2 26 does not support long burst transfers but supports short burst transfers as well as one word register access transactions from Master2 registers 36 to Slave1 registers 38, requested by the processor 314. In this architecture Master1 24 and Master2 26 short burst write transfer requests are saved in a multiple-entry write queue and read transfer requests only need a one-entry read queue, because the system has to wait for the data to be read and does not save multiple read requests.

The arbiter 10 receives bus request signals from each of the shared bus 12 masters 24, 26 and selectively assigns request active status and grants ownership of the bus 12 to one master, based on a particular bus arbitration scheme. Some other bus requests may receive a bus request pending status and they are queued. After the transfer and release of the shared bus 12 by the current master, bus ownership is given to the bus master with the highest priority bus request pending status, for the next operation.

In the architecture of FIG. 1 there is a desire to keep the Master2 26 queue empty, so as not to stop processes inside the processor 314. Thus, the Master2 26 is the control master of the processor 314. Similarly, there is a desire to keep the Master1 24 queue empty so as not to stop processes inside the host processor 22. In the present invention, a hang prevention device 90 may be used to prevent a permanent bus hang condition and to allow recovery of the subsystem to a known state, such as reset state. When present, the hang prevention device 90 is used to monitor the shared bus 12 and provide a way to interrupt any transfer in progress causing the hang-up. It also provides the information necessary for recovery and problem determination.

The high speed interrupt controller 318 is preferably chosen according to the subsystem it is used in. The interrupt lines that will be serviced by this device may be chosen by hard-wiring, but are preferably determined by a programmable mask in one of its registers. The interrupts are serviced by a control software code, with program instructions. The control software code used in the present invention includes a high speed interrupt controller device interrupt handler 323, which controls and monitors the device 318 and the input interrupt signals. The device interrupt handler 323 is preferably located within the processor 314, but, if desired, the high speed interrupt controller 318 may be equipped with a hardware circuit with a processor, and include the device interrupt handler 323 software.

The main purpose of the high speed interrupt controller 318 is to present the device interrupt handler 323 software with accurate information about the source and cause of the interrupt. For example, when the time-out occurs, the processor 314 may be notified by the hang prevention device 90 of the bus hang condition, via an interrupt signal. Moreover, if the request for the shared bus 12 from the Master2 26 is active for longer than the time-out value, a different interrupt type is presented to the processor 314. When there are no outstanding transfer requests from the Master2 26, the hang prevention device 90 sends still another interrupt type to the processor 314, to indicate that all "in progress" transfer operations to that shared bus 12 are successfully completed or aborted, and to indicate the bus cleared status. At this point, the processor 314 can gather any information it needs to determine what type of recovery is needed, such as the status register values from Master2 registers 36 and Slave1 registers 38 from the adapter circuitry 5.

As mentioned previously, the present invention is especially useful when the processor 314 has a limited number of external interrupt input lines. The embodiment presented in FIG. 3 has only one interrupt input line Int1. The high speed interrupt controller 318 of the host adapter 5 provides a multi-master communication system with a capability to receive and discriminate interrupts from multiple alert and interrupt sources and to provide this information to the processor 314 and its device interrupt handler 323 within a few processor internal bus cycles.

The preferred embodiments of the present invention support up to 32 different alert and interrupt lines, from up to 32 sources, but this number can be different. Moreover, there is the capability of masking off any one of the alert and interrupt lines, which disables the particular source of the interrupt but has no effect on the remaining sources.

In FIG. 3, several Intx/Errx lines are shown, presenting interrupt and/or alert signals being sent to the high speed interrupt controller 318 from various sources. Each Intx/Errx signal actually represents signals on two separate lines—an interrupt line and an alert line. Generally, interrupts may be issued after the completion of an operation, such as a DMA transfer, end of frame, or when lack of buffer space is detected. Alerts are issued, for example, for device hardware errors, such as failed chip error, parity error, and may be used during device testing. Although an Intx/Errx signal entering the interrupt controller 318 is presented in FIG. 3 as only one interrupt and/or alert line, it may represent numerous lines, and up to 32 interrupt and alert lines in this embodiment. Some interrupt sources may have several types of interrupts and have several separate interrupt and/or alert lines. Moreover, although the embodiment of FIG. 3 shows only one bus adapter2 317, other embodiments of the present invention may have additional bus adapter2 317 devices, attached to other peripheral devices, via their own peripheral device interfaces.

In the embodiment of FIG. 3 the interrupt and alert lines are connected to the high speed interrupt controller 318 from various sources, such as the memory controller/bus bridge 315, bus adapter2 317 and peripheral device interfaces 350. A buffer 320 may be connected to the processor bus 321 to receive and/or buffer data either sent from the processor 314 to the memory 313, or vice versa, via data lines. Two lines (addr/cntr lines) transfer address and control information associated with the memory 313. Status and interrupt mask lines transfer interrupt status and mask information between the device interrupt handler 323 of the processor 314 and the interrupt controller 318.

Figure 4:
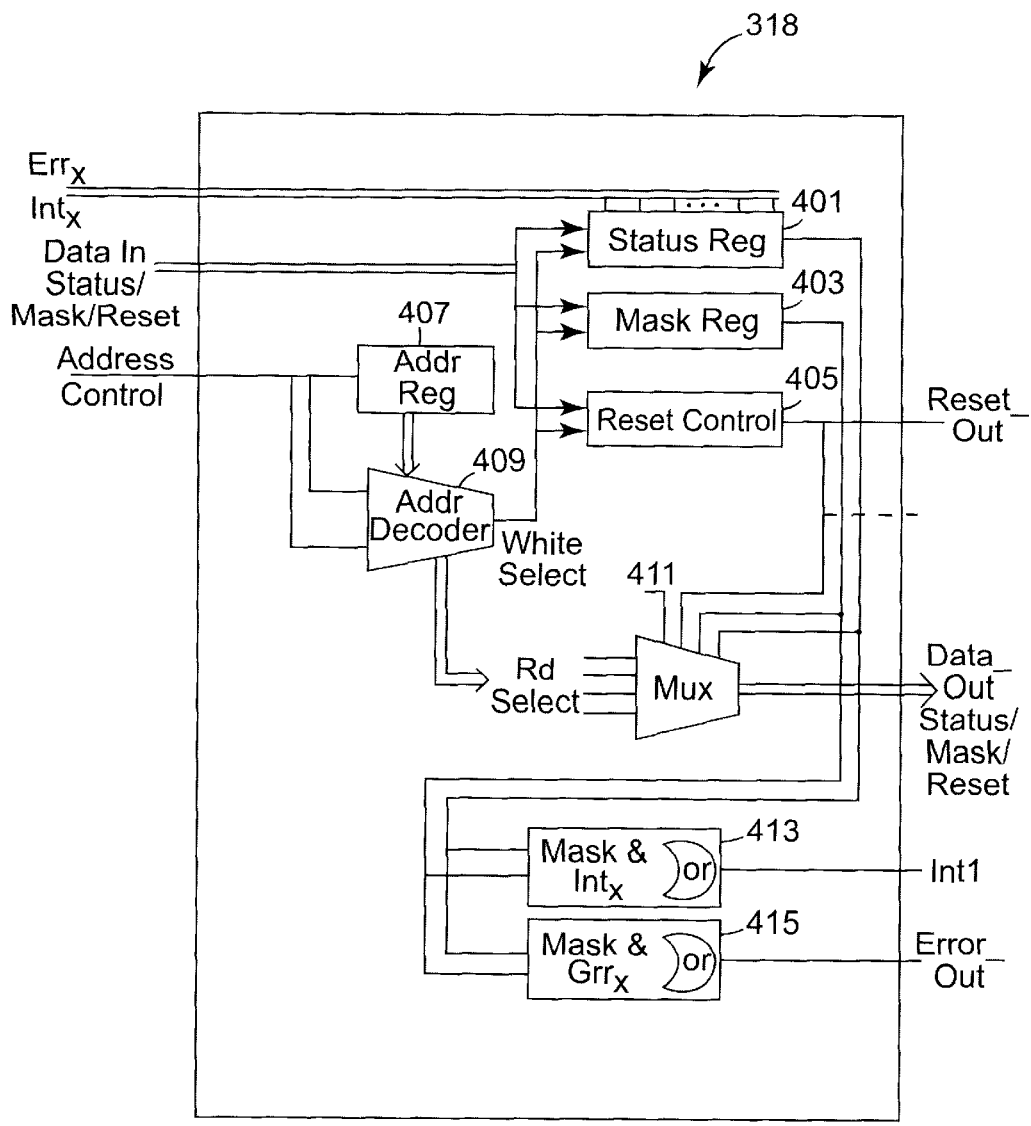
FIG. 4 illustrates a block diagram of the high speed interrupt controller of FIG. 3.

FIG. 4 illustrates a block diagram of the high speed interrupt controller of FIG. 3. The high speed interrupt controller 318 provides a register interface on the 64-bit processor bus 321 to allow the device interrupt handler 323 a fast access to the status of alert and interrupt conditions generated by the system. For this purpose the high speed interrupt controller includes a status register 401, a mask register 403 and a reset register 405. Not shown is another control register, which may be resent when needed for multi-tasking, to pass data to other devices.

The status register 401 has one bit for each interrupt, i.e., 32 bits in this embodiment. Appropriate bit is set by receiving an interrupt from a source device sending the interrupt to the high speed interrupt controller 318. In FIG. 3 embodiment, each of its bits is set by a peripheral device interface 350, the bus adapter2 317, or the memory controller/bus bridge 315. This register is readable by the device interrupt handler 323 of the processor 314 to determine whether an alert and/or interrupt condition exists, and can be written into by the same processor 314 in order to reset those alerts. The processor 314 may be responsible for latching some of the 32 different alerts and interrupts. For example, several interrupt signals (14 in this embodiment) may be a single cycle pulses coming into the interrupt controller 318, and they are latched until cleared by the device interrupt handler 323 microcode (for example, by writing logical 1 into the appropriate bit of the reset register 405 to clear them). The other interrupt lines (18 in this example) may be level sensitive and they will follow whatever the source will drive. Thus, for these interrupt lines the device interrupt handler 323 microcode needs to clear the source when it needs to reset these lines. For this purpose the reset control register 405 of FIG. 4 is used. Upon a request by the device interrupt handler 323, the bits set in the reset control register 405 are read and a reset signal is sent out on the Reset_Out line to any external device needing a reset. This may be used during system recovery. During reset operation, the appropriate mask bits for these devices are set in the mask register 403 until the device reinitialization is completed, when the same mask bits are set off.

The interrupt mask register 403 in this embodiment has 32 bits, corresponding to the bits in the status register 401. It can be read or written by the device interrupt handler 323 of the processor 314 to allow masking each of the alert and interrupt conditions. The external processor input interrupt line Int1 is driven active by a summing device 413 if any of the alert or interrupt input lines (Intx/Errx lines) are active (corresponding bits are set in the status register 401), and the corresponding alert or interrupt is not masked off in the interrupt mask register 403. For example, a single internal processor 314 interrupt is generated on Int1 line if any of the alert or interrupt lines is active while the corresponding interrupt mask bit is off (set to binary zero). Thus, in this example when the mask bit is off (zero) the interrupts from that source are enabled, and when the mask bit is on (set to binary one) the interrupts are disabled.

The summing device 413 consists of a number of AND gates, where the number is equal to the number of interrupt lines (16 in this example). Each AND gate is connected to receive two inputs: the appropriate interrupt bit from the status register 401 and the corresponding bit from the interrupt mask register 403. In the embodiment of FIG. 3 the mask bit first needs to be inverted, if interrupts are enabled when the corresponding interrupt mask bit is off. When both input bits are set, the output is set to signal the receipt of an unmasked interrupt. The output signals from all AND gates are received in an OR gate. The output signal from the OR gate is the processor interrupt input signal Int1, which is set if any AND gate output bit is set.

Additionally, an Error_Out output line is driven by a summing device 415 if any of the alert lines are active and they are not masked off. The device 415 also consists of a number of AND gates, where the number is equal to the number of alert lines (16 in this example). Each AND gate is connected to receive two signals: the appropriate alert bit from the status register 401 and the corresponding bit from the interrupt mask register 403. In the embodiment of FIG. 3 the mask bit first needs to be inverted, if interrupts are enabled when the corresponding interrupt mask bit is off. When both input bits are set, the output is set to signal the receipt of an unmasked alert. The output signals from all AND gates are received in an OR gate. The output signal from the OR gate is the alert signal Error_Out, which is set if any AND gate output bit is set. The Error_Out output line can be hardwired to drive an audio or light source indicator, such as a LED, which may be used in debugging the hardware for alert and hardware error conditions, when the alert line is active and not masked off.

This scheme allows the device interrupt handler 323 microcode to determine the source of the interrupt, by performing a single register read of the status register 401, and using another register read to determine which of the alert and interrupt lines were masked in the interrupt mask register 403 at the time of the interrupt. The device interrupt handler 323 microcode is also used to manage masking and unmasking of alert or interrupt lines, according to the system design requirements or, possibly, for masking some sources during the hang bus condition, prior to the system recovery.

In FIG. 4, Intx/Errx line represent interrupt and alert lines entering the interrupt controller 318 from the memory controller/bus bridge 315, bus adapter2 317, and from the peripheral device interfaces 350. Data_In/Status/Mask line represents all the lines supplying the status register 401, interrupt mask register 403 and reset register 405 with the data from the processor 314, sent via device interrupt handler 323. Address/Control lines supply address and control information, sent by the processor 314, to an address register 407 and an address decoder 409. After a control read or write register command is sent via Control line, the decoding of the sent address is performed in the address register 407 and address decoder 409 in order to select the proper address for reading or writing into one of the three registers: status register 401, interrupt mask register 403 or reset control register 405. The decoded address is placed on the Write_Select or Rd_Select lines. Rd_Select line is used to enable reading the content of either the status register 401, or interrupt mask register 403 or reset control register 405, by only selecting one of the three data paths to the multiplexer 411 and Data_Out lines. Thus, Data-Out line of FIG. 4 actually represents signals from the status register 401, interrupt mask register 403, and the reset control register 405. The status register 401 content and the interrupt mask register 403 content is usually read with two consecutive commands.

The high speed interrupt controller 318 may be utilized in the host adapter 5 cards of FIG. 1, that are designed for the data storage subsystem, or in numerous other communication systems. The preferred embodiment of the present invention of FIG. 3 is designed to support up to 32 different alert and interrupt lines. Even when the processor 314 has only one external interrupt input line Int1, the high speed interrupt controller 318 allows the system to discriminate between multiple alert and interrupt sources in just two register reads (for status register 401 and interrupt mask register 403) on the processor bus 321, which may take to the most ten processor clock cycles. Therefore, the information about the interrupt source is available within a few internal bus 16 cycles. This reduces the need for the processor 314 to use numerous precious data transfer bus resources (e.g. internal bus 16 cycles) to determine the source of the interrupt. It also allows any data transfer to proceed without any interruption by the processor 314.

Figure 2:
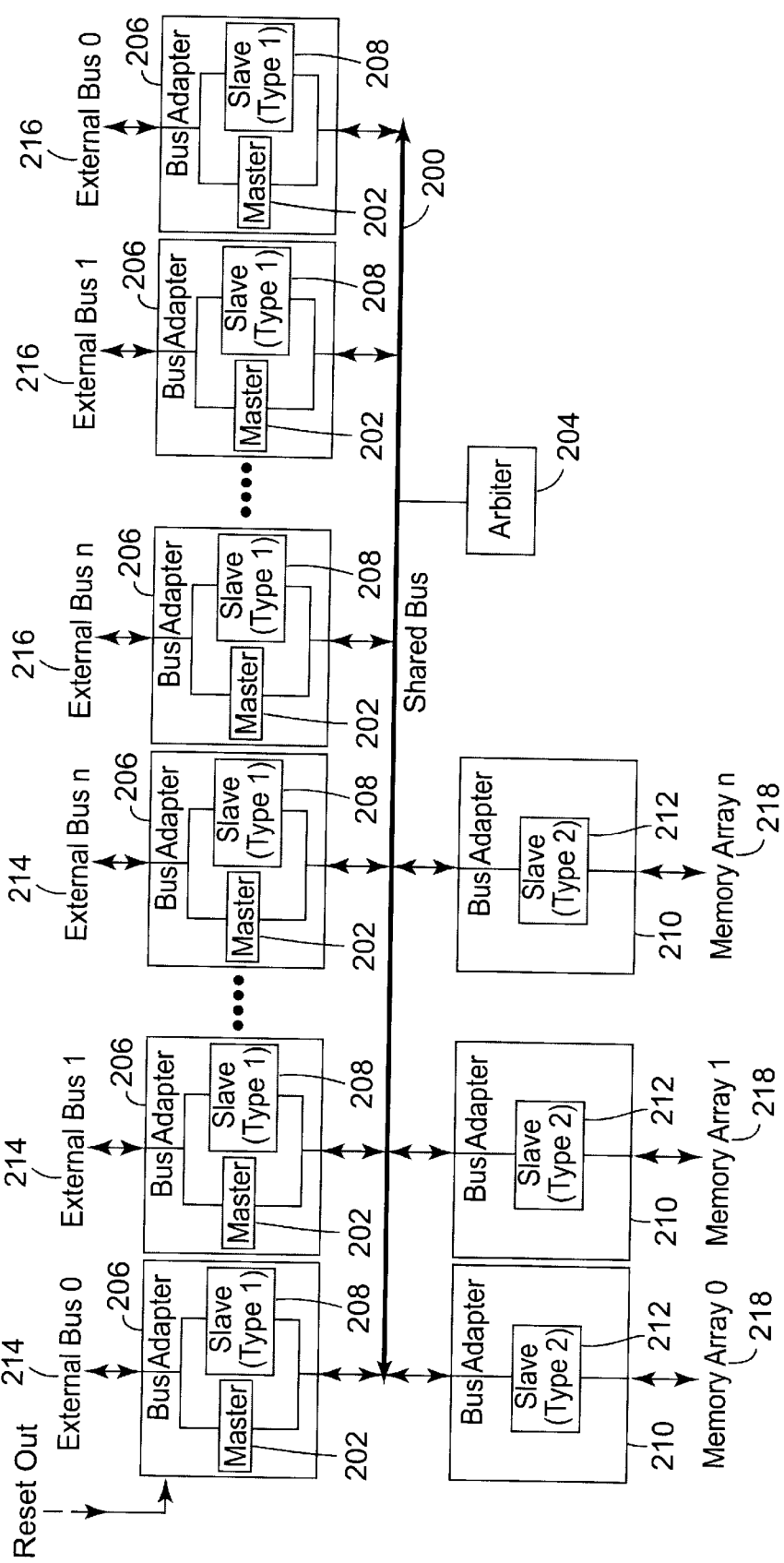
FIG. 2 illustrates a block diagram of a generalized exemplary system embodiment presenting a data communication intermediate circuit, capable of utilizing the high speed interrupt controller of the present invention.

FIG. 2 illustrates a block diagram of another, generalized embodiment of the present invention, presenting a data communication intermediate circuit, capable of utilizing the high speed interrupt controller of the present invention. This circuitry includes a central arbiter 204 to a shared bus 200, configured to control the order in which access to the shared bus 200 is granted. The system may be equipped with a hang prevention device, not shown, used to prevent a permanent bus hang condition and to allow recovery of the subsystem to a known state, such as reset state. In the preferred embodiment of FIG. 2 the high speed interrupt controller is a part of an internal processor system, not shown but attached on any internal bus 216 in the same way as in FIG. 1. The high speed interrupt controller is designed and operates in the same way as described previously.

System components may concurrently request access to the central arbiter 204 control logic in order to acquire a path through which a processor of the processor-shared memory subsystem, not shown, may directly access a peripheral component device mapped anywhere in the system memory or I/O address space. Peripheral components are preferably coupled to the shared bus 200. The bus arbiter 204 is connected to a plurality of bus master and bus slaves, wherein each master requests control of the central shared memory, a processor or a peripheral device, all not shown. The bus arbiter 204 grants control of the shared bus 200 to the bus master with the highest level priority request.

The basic operation of the system embodiment having the architecture of FIG. 2 corresponds to the data flow through the host adapter 5, described in reference to FIG. 1. A variety of optimizations of this general embodiment of the present invention can be made according to a particular implementation or needs of a particular design. For systems employing the shared bus 200 structure with multiple bus masters 202, as shown in FIG. 2 embodiment, the centralized bus arbiter 204 is utilized to decide the shared bus 200 ownership.

FIG. 2 illustrates the multi-master system having a plurality of bus adapters. The first group consists of master/slave adapters 206, each of which consists of both a master 202 and a slave 208 circuit, associated with a shared resource elsewhere within the system. The second group consists of slave adapters 210, each of which only has a slave 212 circuit, affiliated with an unshared resource elsewhere in the system. In the embodiment of FIG. 2, some slaves 208 are connected to one of external buses 214 and the others are connected to one of internal buses 216.

The slave 208, connected to a shared resource via an external bus 214 or internal bus 216, may have to wait to process the transfer via that bus, until the respective external 18 or internal bus 16 resource becomes free. However, each slave 212 connected to an unshared resource, shown in this example in conjunction with an unshared memory array 218, is characterized as always being capable of transferring data with minimal (if any) waiting, because it is directly attached to an unshared resource, only dedicated to this slave 212. Each master 202 capable of performing long burst DMA operations is assumed to have sufficient internal buffering for the full long burst read operations. If this is not the case, the DMA Master 202 relinquishes ownership of the shared bus 200, when its internal buffer becomes full.

In this embodiment, only the bus adapters 206 having a master 202 element can initiate transactions on the shared bus 200. Each bus master 202 is instructed to request the transfer on the shared bus 200 by an initiator processor, not shown. One of a plurality of initiator processors is a host processor, connected with a central shared memory, and some processors may be peripheral device processors, such as the one used for an ESCON or SCSI controller, shown in the embodiment of FIG. 1. Each initiator processor is attached either to the external bus 214 or the internal bus 216.

Each bus master 202 can be instructed to request the shared bus 200 in one of two ways. In the first method, an initiator processor on an external bus 214 or internal bus 216 wishes to write/read a short message to/from a target component, such as the central shared memory or another processor, on another internal bus 216 or external bus 214, or from/to one of the memory arrays 218. In the second method, a DMA channel within the master 202 circuit is instructed by the initiator processor to perform a long burst transaction (either write or read) between its associated internal bus 216 or external bus 214 and one of the slaves 212, for example, to transfer data between the central shared memory and one of the memory arrays 218.

Short messages may be short burst operations or register access transactions, as described previously in regard to FIG. 1 embodiment. Short messages originate from an initiator processor on an external bus 214 or internal bus 216. The short burst messages are typically 4–32 bytes in length and could be either write or read operations. Register access transactions are usually a word long, where the word usually is four bytes in length, and are processed in the same way as short burst transactions, as described below, except that instead of using buffers, data is stored in master and slave registers of master/slave adapters 206.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An interrupt recognition method for quick and effective discrimination and management of interrupts and alerts from multiple interrupting sources, used for assisting a processor with limited number of processor interrupt input lines, comprising:

providing an interrupt controller with a plurality of controller interrupt input lines for receiving interrupts and alerts from the interrupting sources, said interrupt controller connected to the processor and having an interrupt status register and an interrupt masking register;

connecting the interrupt status register bits to the corresponding controller interrupt input lines for recognizing individual interrupts according to the interrupt status register bits;

masking the controller interrupt input lines individually by programmably setting and resetting interrupt masking register bits; and whereupon an interrupt received on an unmasked controller interrupt input line:

asserting an interrupt signal on a processor interrupt input line, reading the interrupt status register and the interrupt masking register by the processor, and servicing the interrupt.

2. The method according to claim 1 wherein the asserting an interrupt signal on a processor interrupt input line performed in a summing device of the interrupt controller, wherein the summing device having an OR gate receiving outputs from a plurality of AND gates, each said AND gate corresponding to one interrupting source, and wherein each said AND gate having a first input for receiving an interrupt status register bit and a second input for receiving the inverted corresponding bit from the interrupt masking register.

3. The method according to claim 1 wherein the masking, reading the interrupt status register and the interrupt masking register, and servicing the interrupt being performed in program instructions of a device interrupt handler associated with the interrupt controller.

4. The method according to claim 3 wherein the device interrupt handler located within the processor.

5. The method according to claim 1 wherein said interrupting source selected from a group comprising a peripheral device interface, a bus adapter, a memory controller, and a bus bridge.

6. The method according to claim 1 wherein the processor having exactly one interrupt input line.

7. The method according to claim 1 wherein the interrupt controller further comprising an interrupt reset register for resetting the interrupting source.

8. The method according to claim 1 wherein an alert defining a hardware error within an interrupting source and an interrupt defining a completion of an operation.

9. The method according to claim 1 wherein the interrupt controller further performing outputting an error signal upon receipt of an alert.

10. An interrupt controller system for extending capabilities of a processor with limited number of interrupt input lines to accommodate and discriminate interrupts and alerts from a plurality of interrupting sources, comprising:

an interrupt controller connected to the processor via a processor bus and configured to receive a plurality of interrupts and alerts from the plurality of interrupting sources, and to assert an interrupt signal to the processor upon receipt of the interrupt from any of the plurality of interrupting sources;

the interrupt controller having a masking device for enabling and disabling the interrupts from the plurality of interrupting sources individually; and a device interrupt handler having program instructions for reading an interrupt status register and the masking device of the interrupt controller, and for recognizing and servicing individual unmasked interrupts according to the interrupting source, upon receipt of the asserted interrupt signal by the processor.

11. The system according to claim 10 wherein the masking device comprising an interrupt masking register for enabling and disabling interrupts by storing a plurality of predetermined interrupt enable flags showing the interrupts permitted to be received by the processor; and wherein said interrupt controller further having an interrupt status register, wherein the interrupt status register bits being connected to the corresponding controller interrupt input lines for recognizing individual interrupts according to the controller interrupt status register bits.

12. The system according to claim 11 wherein the interrupt controller further having a summing device for asserting an interrupt signal to the processor upon receipt of an interrupt from any of the plurality of interrupting sources, wherein the summing device having an OR gate receiving outputs from a plurality of AND gates, each said AND gate corresponding to one interrupting source, and wherein each said AND gate having a first input for receiving an interrupt status register bit and a second input for receiving the inverter corresponding bit from the interrupt masking register.

13. The system according to claim 11 wherein the enabling and disabling bits in the interrupt masking register being programmably set by the device interrupt handler to hold off interrupts arising within selectable interrupting sources.

14. The system according to claim 10 wherein the device interrupt handler located within the processor.

15. The system according to claim 10 wherein said interrupting source selected from a group comprising a peripheral device interface, a bus adapter, a memory controller, and a bus bridge.

16. The system according to claim 10 wherein the interrupt controller further comprising an interrupt reset register for resetting the interrupting source.

17. The system according to claim 10 wherein an alert defining a hardware error within an interrupting source and an interrupt defining a completion of an operation.

18. The system according to claim 10 wherein the interrupt controller outputting an error signal upon receipt of an alert.

19. The system according to claim 10 wherein the processor having exactly one interrupt input line.

20. A shared bus multi-master data communication system with capabilities of discriminating interrupts and alerts from a plurality of interrupting sources by a processor with limited number of interrupt input lines, comprising:

a shared bus located between an external bus connected to a system processor, and an internal bus connected to an internal processor, said internal processor having a limited number of interrupt input lines;

a plurality of bus masters and corresponding slaves connected to the shared bus, some of said masters associated with the external bus and other said masters associated with the internal bus;

an interrupt controller connected to the internal processor via a processor bus and configured to receive a plurality of interrupts and alerts from the plurality of interrupting sources, and to assert an interrupt signal to the internal processor upon receipt of the interrupt from any of the plurality of interrupting sources;

the interrupt controller having a masking device for enabling and disabling the interrupts from the plurality of interrupting sources individually; and a device interrupt handler having program instructions for reading an interrupt status register and the masking device of the interrupt controller, and for recognizing and servicing individual unmasked interrupts according to the interrupting source, upon receipt of the asserted interrupt signal by the internal processor.

21. The system according to claim 20 wherein the masking device comprising an interrupt masking register for enabling and disabling interrupts by storing a plurality of predetermined interrupt enable flags showing the interrupts permitted to be received by the internal processor, and wherein said interrupt controller further having an interrupt status register, wherein the interrupt status register bits being connected to the corresponding controller interrupt input lines for recognizing individual interrupts according to the controller interrupt status register bits.

22. The system according to claim 21 wherein the interrupt controller further having a summing device for asserting an interrupt signal to the internal processor upon receipt of an interrupt from any of the plurality of interrupting sources, wherein the summing device having an OR gate receiving outputs from a plurality of AND gates, each said AND gate corresponding to one interrupting source, and wherein each said AND gate having a first input for receiving an interrupt status register bit and a second input for receiving the inverter corresponding bit from the interrupt masking register.

23. The system according to claim 21 wherein the enabling and disabling bits in the interrupt masking register being programmably set by the device interrupt handler to hold off interrupts arising within selectable interrupting sources.

24. The system according to claim 20 wherein the device interrupt handler located within the internal processor.

25. The system according to claim 20 wherein said interrupting source selected from a group comprising a peripheral device interface, a bus adapter, a memory controller, and a bus bridge.

26. The system according to claim 20 wherein the interrupt controller further comprising an interrupt reset register for resetting the interrupting source.

27. The system according to claim 20 wherein an alert defining a hardware error within an interrupting source and an interrupt defining a completion of an operation.

28. The system according to claim 20 wherein the interrupt controller outputting an error signal upon receipt of an alert.

29. The system according to claim 20 wherein the internal processor having exactly one interrupt input line.

30. The system according to claim 20 wherein said external bus and internal bus being a peripheral component interconnect (PCI) bus.

* * * * *

UNITED STATES PATENT AND TRADEMARK OFFICE
CERTIFICATE OF CORRECTION

PATENT NO.   : 6,606,677 B1                                              Page 1 of 1
DATED        : August 12, 2003
INVENTOR(S)  : Okbay et al.

It is certified that error appears in the above-identified patent and that said Letters Patent is hereby corrected as shown below:

Title page,
Item [73], Assignee, "international Business Machines Corporation" should read
-- International Business Machines Corporation --.
Item [56], References Cited, OTHER PUBLICATIONS, "Integrated Hardware/ Software Interrupt Controller" should read -- "Integrated Hardware/Software Interrupt Controller" --.

Drawings,
Fig. 2, No. 216, "External Bus n" should read -- Internal Bus n --.

Column 6,
Line 11, "press" should read -- Press --.

Signed and Sealed this

Second Day of March, 2004

JON W. DUDAS
*Acting Director of the United States Patent and Trademark Office*